(12) United States Patent
Yamaguchi

(10) Patent No.: US 6,885,755 B2
(45) Date of Patent: Apr. 26, 2005

(54) INFORMATION PROCESSING METHOD

(75) Inventor: Takashi Yamaguchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 699 days.

(21) Appl. No.: 09/812,887

(22) Filed: Mar. 21, 2001

(65) Prior Publication Data

US 2001/0040980 A1 Nov. 15, 2001

(30) Foreign Application Priority Data

Mar. 21, 2000 (JP) ........................................ 2000-078885

(51) Int. Cl.[7] ................................................ G06K 9/00
(52) U.S. Cl. ........................ 382/100; 382/165; 382/210; 358/515; 713/176
(58) Field of Search ................................ 382/100, 106, 382/112, 115, 116, 119, 135, 137, 138, 139, 140, 162, 168, 183, 232, 254, 210, 276, 306; 345/700; 283/75; 713/179, 176; 503/227; 358/501, 515; 356/457

(56) References Cited

U.S. PATENT DOCUMENTS

| | | | | |
|---|---|---|---|---|
| 5,407,893 A | * | 4/1995 | Koshizuka et al. | 503/227 |
| 5,661,574 A | * | 8/1997 | Kawana | 358/501 |
| 5,946,414 A | * | 8/1999 | Cass et al. | 382/183 |
| 5,974,150 A | * | 10/1999 | Kaish et al. | 713/179 |
| 5,995,638 A | * | 11/1999 | Amidror et al. | 382/100 |
| 6,095,566 A | * | 8/2000 | Yamamoto et al. | 283/75 |
| 6,438,251 B1 | * | 8/2002 | Yamaguchi | 382/100 |
| 6,556,688 B1 | * | 4/2003 | Ratnakar | 382/100 |
| 6,693,647 B1 | * | 2/2004 | Bernard et al. | 345/700 |
| 2001/0040980 A1 | | 11/2001 | Yamaguchi | |
| 2002/0080996 A1 | | 6/2002 | Rhoads | |
| 2003/0035045 A1 | | 2/2003 | Miki | |

FOREIGN PATENT DOCUMENTS

| | | |
|---|---|---|
| EP | 1014318 A2 | 6/2000 |
| EP | 1 136 947 A2 | 9/2001 |
| EP | 1 168 817 A2 | 1/2002 |
| JP | 6-59739 | 8/1994 |
| JP | 9-248935 | 9/1997 |
| JP | 0 921 675 A2 | 6/1999 |
| JP | 11-168616 | 6/1999 |
| JP | 11-355554 | 12/1999 |
| JP | 2001-268346 | 9/2001 |
| JP | 2001-274971 | 10/2001 |

OTHER PUBLICATIONS

D. Delannay et al., "Generalized 2–D Cyclic Patterns for Secret Watermark Generation," ICIP 2000—IEEE Signal Processing Society International Conference on Image Processing, vol. 2, Sep. 10, 2000, pp. 77–79.

A. Bhattachariya et al., "Data Embedding in Text for a Copier System," Image Processing, 1999, ICIP 99, Proceedings, pp. 245–249.

* cited by examiner

Primary Examiner—Kanjibhai Patel
Assistant Examiner—Seyed Azarian
(74) Attorney, Agent, or Firm—Pillsbury Winthrop LLP

(57) ABSTRACT

Main image information representing a portrait face image of a person is prepared. Predetermined pattern image information, used as sub image information, is also prepared. Synthetic image information is prepared by synthesizing the main image information with the pattern image information in such a manner that the pattern image information is embedded in the main image information in a state that is not recognizable to the eye of a human being. This synthetic image information is recorded on an ID card or the like as a visible image.

12 Claims, 15 Drawing Sheets

MAIN IMAGE INFORMATION (RED COMPONENTS)

| | 0 | 1 | 2 | 3 | 4 | 5 | 6 | 7 | 8 | 9 | 10 | 11 |
|---|---|---|---|---|---|---|---|---|---|---|---|---|
| 0 | 127 | 127 | 127 | 127 | 127 | 127 | 127 | 127 | 127 | 127 | 127 | 127 |
| 1 | 127 | 127 | 127 | 127 | 127 | 127 | 127 | 127 | 127 | 127 | 127 | 127 |
| 2 | 127 | 127 | 127 | 127 | 127 | 127 | 127 | 127 | 127 | 127 | 127 | 127 |
| 3 | 127 | 127 | 127 | 127 | 127 | 127 | 127 | 127 | 127 | 127 | 127 | 127 |
| 4 | 127 | 127 | 127 | 127 | 127 | 127 | 127 | 127 | 127 | 127 | 127 | 127 |
| 5 | 127 | 127 | 127 | 127 | 127 | 127 | 127 | 127 | 127 | 127 | 127 | 127 |
| 6 | 127 | 127 | 127 | 127 | 127 | 127 | 127 | 127 | 127 | 127 | 127 | 127 |
| 7 | 127 | 127 | 127 | 127 | 127 | 127 | 127 | 127 | 127 | 127 | 127 | 127 |
| 8 | 127 | 127 | 127 | 127 | 127 | 127 | 127 | 127 | 127 | 127 | 127 | 127 |
| 9 | 127 | 127 | 127 | 127 | 127 | 127 | 127 | 127 | 127 | 127 | 127 | 127 |
| 10 | 127 | 127 | 127 | 127 | 127 | 127 | 127 | 127 | 127 | 127 | 127 | 127 |
| 11 | 127 | 127 | 127 | 127 | 127 | 127 | 127 | 127 | 127 | 127 | 127 | 127 |

MAIN IMAGE INFORMATION (GREEN COMPONENTS)

| | 0 | 1 | 2 | 3 | 4 | 5 | 6 | 7 | 8 | 9 | 10 | 11 |
|---|---|---|---|---|---|---|---|---|---|---|---|---|
| 0 | 127 | 127 | 127 | 127 | 127 | 127 | 127 | 127 | 127 | 127 | 127 | 127 |
| 1 | 127 | 127 | 127 | 127 | 127 | 127 | 127 | 127 | 127 | 127 | 127 | 127 |
| 2 | 127 | 127 | 127 | 127 | 127 | 127 | 127 | 127 | 127 | 127 | 127 | 127 |
| 3 | 127 | 127 | 127 | 127 | 127 | 127 | 127 | 127 | 127 | 127 | 127 | 127 |
| 4 | 127 | 127 | 127 | 127 | 127 | 127 | 127 | 127 | 127 | 127 | 127 | 127 |
| 5 | 127 | 127 | 127 | 127 | 127 | 127 | 127 | 127 | 127 | 127 | 127 | 127 |
| 6 | 127 | 127 | 127 | 127 | 127 | 127 | 127 | 127 | 127 | 127 | 127 | 127 |
| 7 | 127 | 127 | 127 | 127 | 127 | 127 | 127 | 127 | 127 | 127 | 127 | 127 |
| 8 | 127 | 127 | 127 | 127 | 127 | 127 | 127 | 127 | 127 | 127 | 127 | 127 |
| 9 | 127 | 127 | 127 | 127 | 127 | 127 | 127 | 127 | 127 | 127 | 127 | 127 |
| 10 | 127 | 127 | 127 | 127 | 127 | 127 | 127 | 127 | 127 | 127 | 127 | 127 |
| 11 | 127 | 127 | 127 | 127 | 127 | 127 | 127 | 127 | 127 | 127 | 127 | 127 |

PATTERN IMAGE INFORMATION

|    | 0 | 1 | 2 | 3 | 4 | 5 | 6 | 7 | 8 | 9 | 10 | 11 |
|----|---|---|---|---|---|---|---|---|---|---|----|----|
| 0  | 1 | 1 | 1 | 1 | 0 | 0 | 0 | 0 | 1 | 1 | 1  | 1  |
| 1  | 1 | 1 | 1 | 1 | 0 | 0 | 0 | 0 | 1 | 1 | 1  | 1  |
| 2  | 0 | 0 | 0 | 0 | 1 | 1 | 1 | 1 | 0 | 0 | 0  | 0  |
| 3  | 0 | 0 | 0 | 0 | 1 | 1 | 1 | 1 | 0 | 0 | 0  | 0  |
| 4  | 1 | 1 | 1 | 1 | 0 | 0 | 0 | 0 | 1 | 1 | 1  | 1  |
| 5  | 1 | 1 | 1 | 1 | 0 | 0 | 0 | 0 | 1 | 1 | 1  | 1  |
| 6  | 0 | 0 | 0 | 0 | 1 | 1 | 1 | 1 | 0 | 0 | 0  | 0  |
| 7  | 0 | 0 | 0 | 0 | 1 | 1 | 1 | 1 | 0 | 0 | 0  | 0  |
| 8  | 1 | 1 | 1 | 1 | 0 | 0 | 0 | 0 | 1 | 1 | 1  | 1  |
| 9  | 1 | 1 | 1 | 1 | 0 | 0 | 0 | 0 | 1 | 1 | 1  | 1  |
| 10 | 0 | 0 | 0 | 0 | 1 | 1 | 1 | 1 | 0 | 0 | 0  | 0  |
| 11 | 0 | 0 | 0 | 0 | 1 | 1 | 1 | 1 | 0 | 0 | 0  | 0  |

COLOR DIFFERENCE MODULATION RESULT

|    | 0   | 1   | 2   | 3   | 4   | 5   | 6   | 7   | 8   | 9   | 10  | 11  |
|----|-----|-----|-----|-----|-----|-----|-----|-----|-----|-----|-----|-----|
| 0  | 48  | 48  | 48  | 48  | -48 | -48 | -48 | -48 | 48  | 48  | 48  | 48  |
| 1  | 48  | 48  | 48  | 48  | -48 | -48 | -48 | -48 | 48  | 48  | 48  | 48  |
| 2  | -48 | -48 | -48 | -48 | 48  | 48  | 48  | 48  | -48 | -48 | -48 | -48 |
| 3  | -48 | -48 | -48 | -48 | 48  | 48  | 48  | 48  | -48 | -48 | -48 | -48 |
| 4  | 48  | 48  | 48  | 48  | -48 | -48 | -48 | -48 | 48  | 48  | 48  | 48  |
| 5  | 48  | 48  | 48  | 48  | -48 | -48 | -48 | -48 | 48  | 48  | 48  | 48  |
| 6  | -48 | -48 | -48 | -48 | 48  | 48  | 48  | 48  | -48 | -48 | -48 | -48 |
| 7  | -48 | -48 | -48 | -48 | 48  | 48  | 48  | 48  | -48 | -48 | -48 | -48 |
| 8  | 48  | 48  | 48  | 48  | -48 | -48 | -48 | -48 | 48  | 48  | 48  | 48  |
| 9  | 48  | 48  | 48  | 48  | -48 | -48 | -48 | -48 | 48  | 48  | 48  | 48  |
| 10 | -48 | -48 | -48 | -48 | 48  | 48  | 48  | 48  | -48 | -48 | -48 | -48 |
| 11 | -48 | -48 | -48 | -48 | 48  | 48  | 48  | 48  | -48 | -48 | -48 | -48 |

SUPERIMPOSITION PROCESSING RESULT (RED COMPONENTS)

|    | 0 | 1 | 2 | 3 | 4 | 5 | 6 | 7 | 8 | 9 | 10 | 11 |
|----|---|---|---|---|---|---|---|---|---|---|----|----|
| 0  | 175 | 175 | 175 | 175 | 79 | 79 | 79 | 79 | 175 | 175 | 175 | 175 |
| 1  | 175 | 175 | 175 | 175 | 79 | 79 | 79 | 79 | 175 | 175 | 175 | 175 |
| 2  | 79 | 79 | 79 | 79 | 175 | 175 | 175 | 175 | 79 | 79 | 79 | 79 |
| 3  | 79 | 79 | 79 | 79 | 175 | 175 | 175 | 175 | 79 | 79 | 79 | 79 |
| 4  | 175 | 175 | 175 | 175 | 79 | 79 | 79 | 79 | 175 | 175 | 175 | 175 |
| 5  | 175 | 175 | 175 | 175 | 79 | 79 | 79 | 79 | 175 | 175 | 175 | 175 |
| 6  | 79 | 79 | 79 | 79 | 175 | 175 | 175 | 175 | 79 | 79 | 79 | 79 |
| 7  | 79 | 79 | 79 | 79 | 175 | 175 | 175 | 175 | 79 | 79 | 79 | 79 |
| 8  | 175 | 175 | 175 | 175 | 79 | 79 | 79 | 79 | 175 | 175 | 175 | 175 |
| 9  | 175 | 175 | 175 | 175 | 79 | 79 | 79 | 79 | 175 | 175 | 175 | 175 |
| 10 | 79 | 79 | 79 | 79 | 175 | 175 | 175 | 175 | 79 | 79 | 79 | 79 |
| 11 | 79 | 79 | 79 | 79 | 175 | 175 | 175 | 175 | 79 | 79 | 79 | 79 |

SUPERIMPOSITION PROCESSING RESULT (GREEN COMPONENTS)

|    | 0 | 1 | 2 | 3 | 4 | 5 | 6 | 7 | 8 | 9 | 10 | 11 |
|----|---|---|---|---|---|---|---|---|---|---|----|----|
| 0  | 79 | 79 | 79 | 79 | 175 | 175 | 175 | 175 | 79 | 79 | 79 | 79 |
| 1  | 79 | 79 | 79 | 79 | 175 | 175 | 175 | 175 | 79 | 79 | 79 | 79 |
| 2  | 175 | 175 | 175 | 175 | 79 | 79 | 79 | 79 | 175 | 175 | 175 | 175 |
| 3  | 175 | 175 | 175 | 175 | 79 | 79 | 79 | 79 | 175 | 175 | 175 | 175 |
| 4  | 79 | 79 | 79 | 79 | 175 | 175 | 175 | 175 | 79 | 79 | 79 | 79 |
| 5  | 79 | 79 | 79 | 79 | 175 | 175 | 175 | 175 | 79 | 79 | 79 | 79 |
| 6  | 175 | 175 | 175 | 175 | 79 | 79 | 79 | 79 | 175 | 175 | 175 | 175 |
| 7  | 175 | 175 | 175 | 175 | 79 | 79 | 79 | 79 | 175 | 175 | 175 | 175 |
| 8  | 79 | 79 | 79 | 79 | 175 | 175 | 175 | 175 | 79 | 79 | 79 | 79 |
| 9  | 79 | 79 | 79 | 79 | 175 | 175 | 175 | 175 | 79 | 79 | 79 | 79 |
| 10 | 175 | 175 | 175 | 175 | 79 | 79 | 79 | 79 | 175 | 175 | 175 | 175 |
| 11 | 175 | 175 | 175 | 175 | 79 | 79 | 79 | 79 | 175 | 175 | 175 | 175 |

|    | 0 | 1 | 2 | 3 | 4 | 5 | 6 | 7 | 8 | 9 | 10 | 11 |
|----|---|---|---|---|---|---|---|---|---|---|----|----|
| 0  | R | R | R | R | C | C | C | C | R | R | R  | R  |
| 1  | R | R | R | R | C | C | C | C | R | R | R  | R  |
| 2  | C | C | C | C | R | R | R | R | C | C | C  | C  |
| 3  | C | C | C | C | R | R | R | R | C | C | C  | C  |
| 4  | R | R | R | R | C | C | C | C | R | R | R  | R  |
| 5  | R | R | R | R | C | C | C | C | R | R | R  | R  |
| 6  | C | C | C | C | R | R | R | R | C | C | C  | C  |
| 7  | C | C | C | C | R | R | R | R | C | C | C  | C  |
| 8  | R | R | R | R | C | C | C | C | R | R | R  | R  |
| 9  | R | R | R | R | C | C | C | C | R | R | R  | R  |
| 10 | C | C | C | C | R | R | R | R | C | C | C  | C  |
| 11 | C | C | C | C | R | R | R | R | C | C | C  | C  |

FIG. 10

|    | 0 | 1 | 2 | 3 | 4 | 5 | 6 | 7 | 8 | 9 | 10 | 11 |
|----|---|---|---|---|---|---|---|---|---|---|----|----|
| 0  | R | R | R | R | C | C | C | C | R | R | R  | R  |
| 1  | R | R | R | R | C | C | C | C | R | R | R  | R  |
| 2  | C | C | C | C | R | R | R | R | C | C | C  | C  |
| 3  | C | C | C | C | R | R | R | R | C | C | C  | C  |
| 4  | R | R | R | R | C | C | C | C | R | R | R  | R  |
| 5  | R | R | R | R | C | C | C | C | R | R | R  | R  |
| 6  | C | C | C | C | R | R | R | R | C | C | C  | C  |
| 7  | C | C | C | C | R | R | R | R | C | C | C  | C  |
| 8  | R | R | R | R | C | C | C | C | R | R | R  | R  |
| 9  | R | R | R | R | C | C | C | C | R | R | R  | R  |
| 10 | C | C | C | C | R | R | R | R | C | C | C  | C  |
| 11 | C | C | C | C | R | R | R | R | C | C | C  | C  |

FIG. 11

FIRST PATTERN
IMAGE INFORMATION

SECOND PATTERN
IMAGE INFORMATION

MAIN IMAGE INFORMATION
(RED COMPONENTS)      101R

|   | 0 | 1 | 2 | 3 | 4 | 5 | 6 | 7 | 8 | 9 | 10 | 11 |
|---|---|---|---|---|---|---|---|---|---|---|----|----|
| 0 | 127 | 127 | 127 | 127 | 127 | 127 | 127 | 127 | 127 | 127 | 127 | 127 |
| 1 | 127 | 127 | 127 | 127 | 127 | 127 | 127 | 127 | 127 | 127 | 127 | 127 |
| 2 | 127 | 127 | 127 | 127 | 127 | 127 | 127 | 127 | 127 | 127 | 127 | 127 |
| 3 | 127 | 127 | 127 | 127 | 127 | 127 | 127 | 127 | 127 | 127 | 127 | 127 |
| 4 | 127 | 127 | 127 | 127 | 127 | 127 | 127 | 127 | 127 | 127 | 127 | 127 |
| 5 | 127 | 127 | 127 | 127 | 127 | 127 | 127 | 127 | 127 | 127 | 127 | 127 |
| 6 | 127 | 127 | 127 | 127 | 127 | 127 | 127 | 127 | 127 | 127 | 127 | 127 |
| 7 | 127 | 127 | 127 | 127 | 127 | 127 | 127 | 127 | 127 | 127 | 127 | 127 |
| 8 | 127 | 127 | 127 | 127 | 127 | 127 | 127 | 127 | 127 | 127 | 127 | 127 |
| 9 | 127 | 127 | 127 | 127 | 127 | 127 | 127 | 127 | 127 | 127 | 127 | 127 |
| 10 | 127 | 127 | 127 | 127 | 127 | 127 | 127 | 127 | 127 | 127 | 127 | 127 |
| 11 | 127 | 127 | 127 | 127 | 127 | 127 | 127 | 127 | 127 | 127 | 127 | 127 |

AREA A ←——— | ———→ AREA B

F I G. 17

MAIN IMAGE INFORMATION
(GREEN COMPONENTS)      101G

|   | 0 | 1 | 2 | 3 | 4 | 5 | 6 | 7 | 8 | 9 | 10 | 11 |
|---|---|---|---|---|---|---|---|---|---|---|----|----|
| 0 | 127 | 127 | 127 | 127 | 127 | 127 | 127 | 127 | 127 | 127 | 127 | 127 |
| 1 | 127 | 127 | 127 | 127 | 127 | 127 | 127 | 127 | 127 | 127 | 127 | 127 |
| 2 | 127 | 127 | 127 | 127 | 127 | 127 | 127 | 127 | 127 | 127 | 127 | 127 |
| 3 | 127 | 127 | 127 | 127 | 127 | 127 | 127 | 127 | 127 | 127 | 127 | 127 |
| 4 | 127 | 127 | 127 | 127 | 127 | 127 | 127 | 127 | 127 | 127 | 127 | 127 |
| 5 | 127 | 127 | 127 | 127 | 127 | 127 | 127 | 127 | 127 | 127 | 127 | 127 |
| 6 | 127 | 127 | 127 | 127 | 127 | 127 | 127 | 127 | 127 | 127 | 127 | 127 |
| 7 | 127 | 127 | 127 | 127 | 127 | 127 | 127 | 127 | 127 | 127 | 127 | 127 |
| 8 | 127 | 127 | 127 | 127 | 127 | 127 | 127 | 127 | 127 | 127 | 127 | 127 |
| 9 | 127 | 127 | 127 | 127 | 127 | 127 | 127 | 127 | 127 | 127 | 127 | 127 |
| 10 | 127 | 127 | 127 | 127 | 127 | 127 | 127 | 127 | 127 | 127 | 127 | 127 |
| 11 | 127 | 127 | 127 | 127 | 127 | 127 | 127 | 127 | 127 | 127 | 127 | 127 |

AREA A ←——— | ———→ AREA B

F I G. 18

FIRST PATTERN IMAGE INFORMATION

|    | 0 | 1 | 2 | 3 | 4 | 5 |
|----|---|---|---|---|---|---|
| 0  | 1 | 1 | 1 | 1 | 0 | 0 |
| 1  | 1 | 1 | 1 | 1 | 0 | 0 |
| 2  | 0 | 0 | 0 | 0 | 1 | 1 |
| 3  | 0 | 0 | 0 | 0 | 1 | 1 |
| 4  | 1 | 1 | 1 | 1 | 0 | 0 |
| 5  | 1 | 1 | 1 | 1 | 0 | 0 |
| 6  | 0 | 0 | 0 | 0 | 1 | 1 |
| 7  | 0 | 0 | 0 | 0 | 1 | 1 |
| 8  | 1 | 1 | 1 | 1 | 0 | 0 |
| 9  | 1 | 1 | 1 | 1 | 0 | 0 |
| 10 | 0 | 0 | 0 | 0 | 1 | 1 |
| 11 | 0 | 0 | 0 | 0 | 1 | 1 |

SECOND PATTERN IMAGE INFORMATION

|    | 0 | 1 | 2 | 3 | 4 | 5 |
|----|---|---|---|---|---|---|
| 0  | 0 | 0 | 1 | 1 | 0 | 0 |
| 1  | 0 | 0 | 1 | 1 | 0 | 0 |
| 2  | 0 | 0 | 1 | 1 | 0 | 0 |
| 3  | 0 | 0 | 1 | 1 | 0 | 0 |
| 4  | 1 | 1 | 0 | 0 | 1 | 1 |
| 5  | 1 | 1 | 0 | 0 | 1 | 1 |
| 6  | 1 | 1 | 0 | 0 | 1 | 1 |
| 7  | 1 | 1 | 0 | 0 | 1 | 1 |
| 8  | 0 | 0 | 1 | 1 | 0 | 0 |
| 9  | 0 | 0 | 1 | 1 | 0 | 0 |
| 10 | 0 | 0 | 1 | 1 | 0 | 0 |
| 11 | 0 | 0 | 1 | 1 | 0 | 0 |

|    | 0 | 1 | 2 | 3 | 4 | 5 | 6 | 7 | 8 | 9 | 10 | 11 |
|----|---|---|---|---|---|---|---|---|---|---|----|----|
| 0  | R | R | R | R | C | C | C | C | R | R | C  | C  |
| 1  | R | R | R | R | C | C | C | C | R | R | C  | C  |
| 2  | C | C | C | C | R | R | C | C | R | R | C  | C  |
| 3  | C | C | C | C | R | R | C | C | R | R | C  | C  |
| 4  | R | R | R | R | C | C | R | R | C | C | R  | R  |
| 5  | R | R | R | R | C | C | R | R | C | C | R  | R  |
| 6  | C | C | C | C | R | R | R | R | C | C | R  | R  |
| 7  | C | C | C | C | R | R | R | R | C | C | R  | R  |
| 8  | R | R | R | R | C | C | C | C | R | R | C  | C  |
| 9  | R | R | R | R | C | C | C | C | R | R | C  | C  |
| 10 | C | C | C | C | R | R | C | C | R | R | C  | C  |
| 11 | C | C | C | C | R | R | C | C | R | R | C  | C  |

AREA A ←——— | ———→ AREA B

FIG. 21

|    | 0 | 1 | 2 | 3 | 4 | 5 | 6 | 7 | 8 | 9 | 10 | 11 |
|----|---|---|---|---|---|---|---|---|---|---|----|----|
| 0  | R | R | R | R | C | C | C | C | R | R | C  | C  |
| 1  | R | R | R | R | C | C | C | C | R | R | C  | C  |
| 2  | C | C | C | C | R | R | C | C | R | R | C  | C  |
| 3  | C | C | C | C | R | R | C | C | R | R | C  | C  |
| 4  | R | R | R | R | C | C | R | R | C | C | R  | R  |
| 5  | R | R | R | R | C | C | R | R | C | C | R  | R  |
| 6  | C | C | C | C | R | R | R | R | C | C | R  | R  |
| 7  | C | C | C | C | R | R | R | R | C | C | R  | R  |
| 8  | R | R | R | R | C | C | C | C | R | R | C  | C  |
| 9  | R | R | R | R | C | C | C | C | R | R | C  | C  |
| 10 | C | C | C | C | R | R | C | C | R | R | C  | C  |
| 11 | C | C | C | C | R | R | C | C | R | R | C  | C  |

AREA A ←——— | ———→ AREA B

|   | 0 | 1 | 2 | 3 | 4 | 5 | 6 | 7 | 8 | 9 | 10 | 11 |
|---|---|---|---|---|---|---|---|---|---|---|----|----|
| 0 | R | R | R | R | C | C | C | C | R | R | C | C |
| 1 | R | R | R | R | C | C | C | C | R | R | C | C |
| 2 | C | C | C | C | R | R | C | C | R | R | C | C |
| 3 | C | C | C | C | R | R | C | C | R | R | C | C |
| 4 | R | R | R | R | C | C | R | R | C | C | R | R |
| 5 | R | R | R | R | C | C | R | R | C | C | R | R |
| 6 | C | C | C | C | R | R | R | R | C | C | R | R |
| 7 | C | C | C | C | R | R | R | R | C | C | R | R |
| 8 | R | R | R | R | C | C | C | C | R | R | C | C |
| 9 | R | R | R | R | C | C | C | C | R | R | C | C |
| 10 | C | C | C | C | R | R | C | C | R | R | C | C |
| 11 | C | C | C | C | R | R | C | C | R | R | C | C |

AREA A ← | → AREA B

FIG. 24

|   | 0 | 1 | 2 | 3 | 4 | 5 | 6 | 7 | 8 | 9 | 10 | 11 |
|---|---|---|---|---|---|---|---|---|---|---|----|----|
| 0 | R | R | R | R | C | C | C | C | R | R | C | C |
| 1 | R | R | R | R | C | C | C | C | R | R | C | C |
| 2 | C | C | C | C | R | R | C | C | R | R | C | C |
| 3 | C | C | C | C | R | R | C | C | R | R | C | C |
| 4 | R | R | R | R | C | C | R | R | C | C | R | R |
| 5 | R | R | R | R | C | C | R | R | C | C | R | R |
| 6 | C | C | C | C | R | R | R | R | C | C | R | R |
| 7 | C | C | C | C | R | R | R | R | C | C | R | R |
| 8 | R | R | R | R | C | C | C | C | R | R | C | C |
| 9 | R | R | R | R | C | C | C | C | R | R | C | C |
| 10 | C | C | C | C | R | R | C | C | R | R | C | C |
| 11 | C | C | C | C | R | R | C | C | R | R | C | C |

AREA A ← | → AREA B

|  | 0 | 1 | 2 | 3 | 4 | 5 | 6 | 7 | 8 | 9 | 10 | 11 |
|---|---|---|---|---|---|---|---|---|---|---|---|---|
| 0 | R | R | R | R | C | C | C | C | R | R | C | C |
| 1 | R | R | R | R | C | C | C | C | R | R | C | C |
| 2 | C | C | C | C | R | R | C | C | R | R | C | C |
| 3 | C | C | C | C | R | R | C | C | R | R | C | C |
| 4 | R | R | R | R | C | C | R | R | C | C | R | R |
| 5 | R | R | R | R | C | C | R | R | C | C | R | R |
| 6 | C | C | C | C | R | R | R | R | C | C | R | R |
| 7 | C | C | C | C | R | R | R | R | C | C | R | R |
| 8 | R | R | R | R | C | C | C | C | R | R | C | C |
| 9 | R | R | R | R | C | C | C | C | R | R | C | C |
| 10 | C | C | C | C | R | R | C | C | R | R | C | C |
| 11 | C | C | C | C | R | R | C | C | R | R | C | C |
AREA A ← | → AREA B
F I G. 25
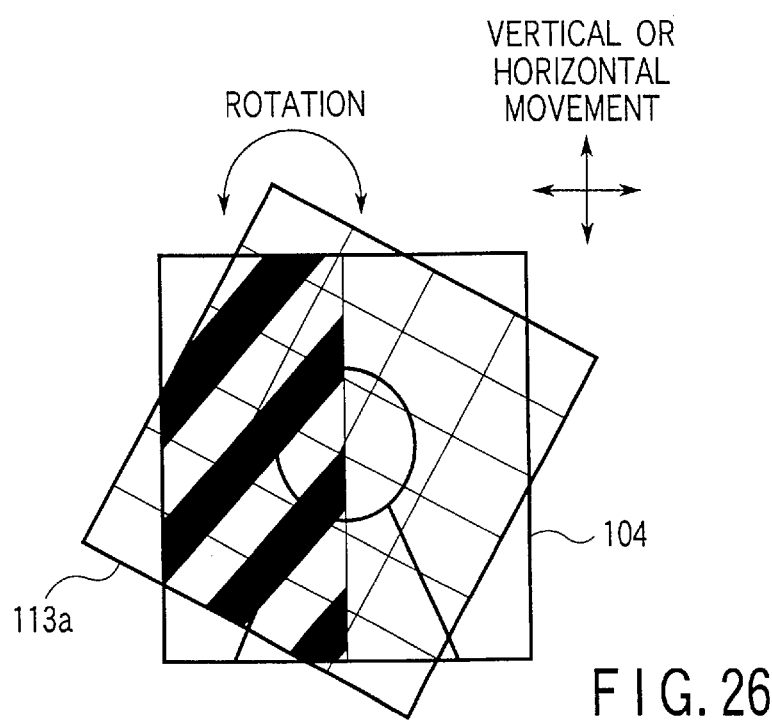
F I G. 26

INFORMATION PROCESSING METHOD

CROSS-REFERENCE TO RELATED APPLICATIONS

This application is based upon and claims the benefit of priority from the prior Japanese Patent application No. 2000-078885, filed Mar. 21, 2000, the entire contents of which are incorporated herein by reference.

BACKGROUND OF THE INVENTION

The present invention relates to an information processing method for synthesizing main image information (which represents a portrait face image, for example) with sub image information (which is additional information, such as security information) and recording resultant synthetic image on a recording medium. The information processing method is also for sensing the sub image information from the recorded synthetic information.

In recent years, the technology for electronic watermark and signature is attracting more attention in accordance with the widespread computerization of information and the wide use of the Internet. This kind of technology creates synthetic image information by synthesizing main and sub image information. It is effective in preparing an ID card on which a portrait face image is printed, and also effective in preventing making an illegal copy, forgery, and modification of a picture in which copyright information is embedded.

"How To Synthesize And Encode Text Data In Color Density Pattern," Journal Published by the Academic Image Electronics Society of Japan, 17-4 (1988), pp. 194–198, discloses a method for superimposing information on a digital image represented in pseudo-gradation.

Jpn. Pat. Appln. KOKAI Publication No. 9-248935 discloses a method for embedding a monochromatic binary image in a color image, using color sensitivity.

Jpn. Pat. Appln. KOKAI Publication No. 6-10190 discloses a method for preventing forgery and modification of an ID card. According to the reference, the ID card is overlaid with either a transparent film having a unique fine-line pattern or mesh pattern, or a lenticular film having a predetermined frequency. Since moiré patterns generated then are different depending upon the films laid on the ID card, the forgery and modification are prevented.

According to "How To Synthesize And Encode Text Data In Color Density Pattern," the sub image information embedded in synthetic image information is reproduced for verification by reading the synthetic image information by use of high-resolution read means and reproducing the sub image information from the read image information. Since the high-resolution read means (scanner) is required for reading the synthetic image formation, the verification is not easy.

According to Jpn. Pat. Appln. KOKAI Publication No. 9-248935, the embedded sub image picture is reproduced by laying a sheet-like mask on the synthetic image information with high accuracy. In this case, the sub image information is reproduced by accurately positioning the sheet-like mask and the synthetic image information with reference to each other. In other words, extremely high accuracy is needed when the synthetic image information is recorded and when the sub image information is reproduced. Since easy reproduction of the sub image information is not enabled, easy verification is not possible.

According to Jpn. Pat. Appln. KOKAI Publication No. 6-10190, sub image information used for verification is prepared in a state where it can be visually perceived by a human being. This means that the storage position of the information that is essentially important to the verification may be easily known. Hence, the method of the reference is not reliable in terms of security.

As described above, the conventional information processing method has the problem that the easy verification based on the sub image information for security and the reliable security for verification are incompatible.

BRIEF SUMMARY OF THE INVENTION

Accordingly, an object of the present invention is to provide an information processing method which enables sub image information to be synthesized with main image information that is recognizable to the naked eye of a human being, in such a manner that the synthesis itself is executed in a state that is not recognizable to the naked eye of the human being, and which enables the sub image information to be easily sensed in a simple way, thereby attaining easy verification based on the sub image information.

The present invention provides an information processing method comprising: a first step of preparing main image information that is recognizable to the naked eye of a human being; a second step of preparing pattern image information; a third step of executing color difference modulation processing for the pattern image information prepared in the second step in accordance with a predetermined color difference modulation amount, and superimposing the pattern image information, which has been modulated in color difference by the color difference modulation processing, on the main image information prepared in the first step, thereby preparing synthetic image information; and a fourth step of recording the synthetic image information, prepared in the third step, on a recording medium as a visible image.

The present invention also provides an information processing method comprising: a first step of preparing main image information that is recognizable to the naked eye of a human being; a second step of preparing a plurality of kinds of pattern image information, which is defined by a repetition of a pattern image; a third step of preparing synthetic image information by synthesizing the pattern image information prepared in the second step with a plurality of areas of the main image information prepared in the first step, such that the synthesized state in which the plurality of pattern image information are integrated with the main image information is not recognizable to the naked eye of the human being; and a fourth step of recording the synthetic image information, prepared in the third step, on a recording medium as a visible image.

The present invention further provides an image processing step comprising: a first step of preparing main image information that is recognizable to the naked eye of a human being; a second step of preparing sub image information by preparing first pattern image information and second pattern image information different from the first pattern image information, and by assigning the first and second pattern image information to the main image information such that the first pattern image information is assigned to an area corresponding binary image information representing a character or a symbol and such that the second pattern image signal is assigned to a background area which is other than the area corresponding to the character or the symbol; a third step of preparing synthetic image information by synthesizing the sub image information prepared in the second step with the main image information prepared in the first step, such that the synthesized state is not recognizable to the naked eye of the human being; and a fourth step of recording the synthetic image information, prepared in the third step, on a recording medium as a visible image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 shows red components of main image information.

FIG. 5 is green components of the main image information.

FIG. 6 illustrates pattern image information.

FIG. 7 shows an example of a result of color difference modulation.

FIG. 8 shows red components of a result of superimposition processing.

FIG. 9 shows green components of a result of superimposition processing.

FIG. 10 is a schematic diagram illustrating an example of a synthetic image.

FIG. 11 is a schematic diagram illustrating an example of verification processing.

FIG. 17 illustrates red components of main image information.

FIG. 18 illustrates green components of the main image information.

FIG. 19 shows an example of first pattern image information.

FIG. 20 shows an example of second pattern image information.

FIG. 21 is a schematic diagram illustrating a synthetic image.

FIG. 22 is a schematic diagram illustrating a first example of verification processing.

FIG. 23 is also a schematic diagram illustrating a first example of verification processing.

FIG. 24 is a schematic diagram illustrating a second example of verification processing.

FIG. 25 is also a schematic diagram illustrating a second example of verification processing.

FIG. 26 is a schematic diagram illustrating how verification processing is executed.

DETAILED DESCRIPTION OF THE INVENTION

Embodiments of the present invention will now be described with reference to the accompanying drawings.

First, the first embodiment will be described.

Figure 1:
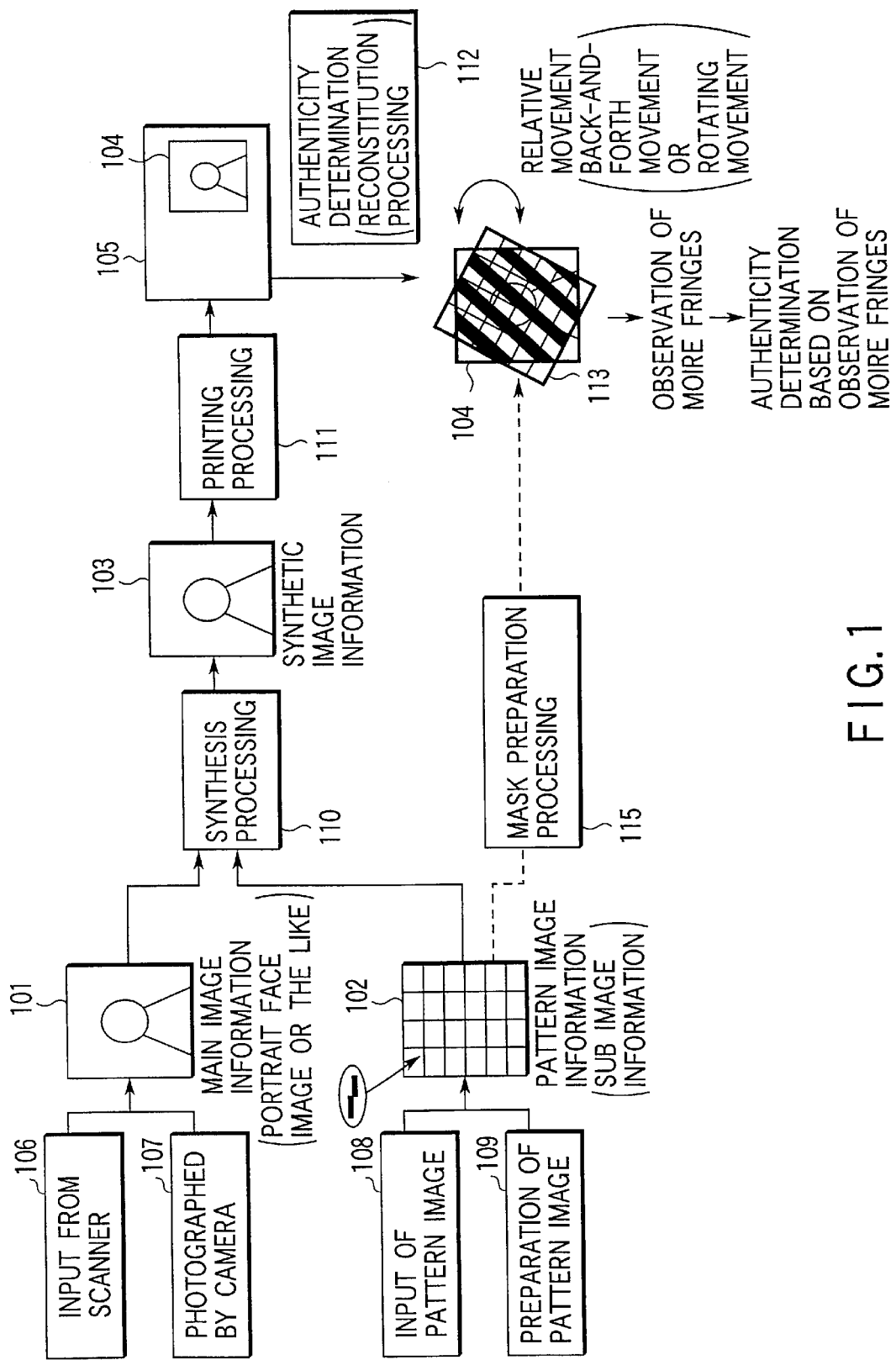
FIG. 1 is a flowchart illustrating the overall flow of the information processing method according to the first embodiment of the present invention.

FIG. 1 is a flowchart illustrating the overall flow of the information processing method according to the first embodiment of the present invention. The overall flow of the information processing method will be described, referring to this flowchart.

In FIG. 1, main image information 101 is a portrait face image used for identification. The main image information 101 is comprised of digital data. It is prepared by reading a photographed portrait face image by scanner input processing 106 or by photographing a person's face by camera photographing processing 107.

Pattern image information 102, which is sub image information, is prepared either by pattern image input processing 108 or by pattern image preparation processing 109. The pattern image input processing 108 is executed when a pattern image is externally input. The pattern image preparation processing 109 is executed when a pattern image is prepared on the basis of a predetermined pattern. In the first embodiment, the pattern image information 102 is in the form of a pattern, wherein the unit size is a rectangle of 4 pixels (horizontal)×2 pixels (vertical) and which is expressed as a cyclic pattern of black and white rectangles.

By synthesis processing 110, the main image information 101 and the pattern image information 102 are synthesized to obtain synthetic image information 103. In the synthetic image information 103, the pattern image information 102 is embedded in the main image information 101 in a state that cannot be recognized to the naked eye of a human being. The details of the synthesis processing 110 will be described later.

By printing processing 111, a synthetic image 104 based on the synthetic image information 103 is printed on an ID card 105. An image forming apparatus, such as a dye-sublimation type thermal transfer printer, is used for the printing processing 111. This image forming apparatus prints (records) the image based on the synthetic image information at a face image print position on the ID card 105, which is a recording medium. The synthetic image 104 printed on the ID card 105 by the print processing 111 is used as a face image for identification. To the naked eye of a human being, the synthetic image 104 looks as if it were the same as the image information 101.

The ID card 105 prepared in this manner can be subjected to verification processing 112 to determine if it is authentic.

Let it be assumed that a sheet-like mask (hereinafter referred to as a mask sheet) 113 is prepared by mask preparation processing 115. The mask sheet 113 has the same pattern of light transmission factor as the pattern image information 102. The mask sheet 113 is laid on the synthetic image 104 of the ID card 105, and is moved relative to the synthetic image 104. The relative movement between the mask sheet 113 and the synthetic image 104 is either linear movement or rotation. In the case of the linear movement, it is either vertical or horizontal. In the case of the rotation, one of the mask sheet 113 and the synthetic image 104 is fixed, and the other is rotated.

If the ID card is authentic, the relative movement between the mask sheet 113 and the synthetic image 104 produces moiré fringes, the principle of which will be describe later. In other words, if those moiré fringes are produced, it can be determined that the ID card 105 is authentic. If the relative movement between the mask sheet 113 and the synthetic image 104 does not produce any moiré fringes, then it can be determined that that the ID card 105 is a forged one.

Figure 2:
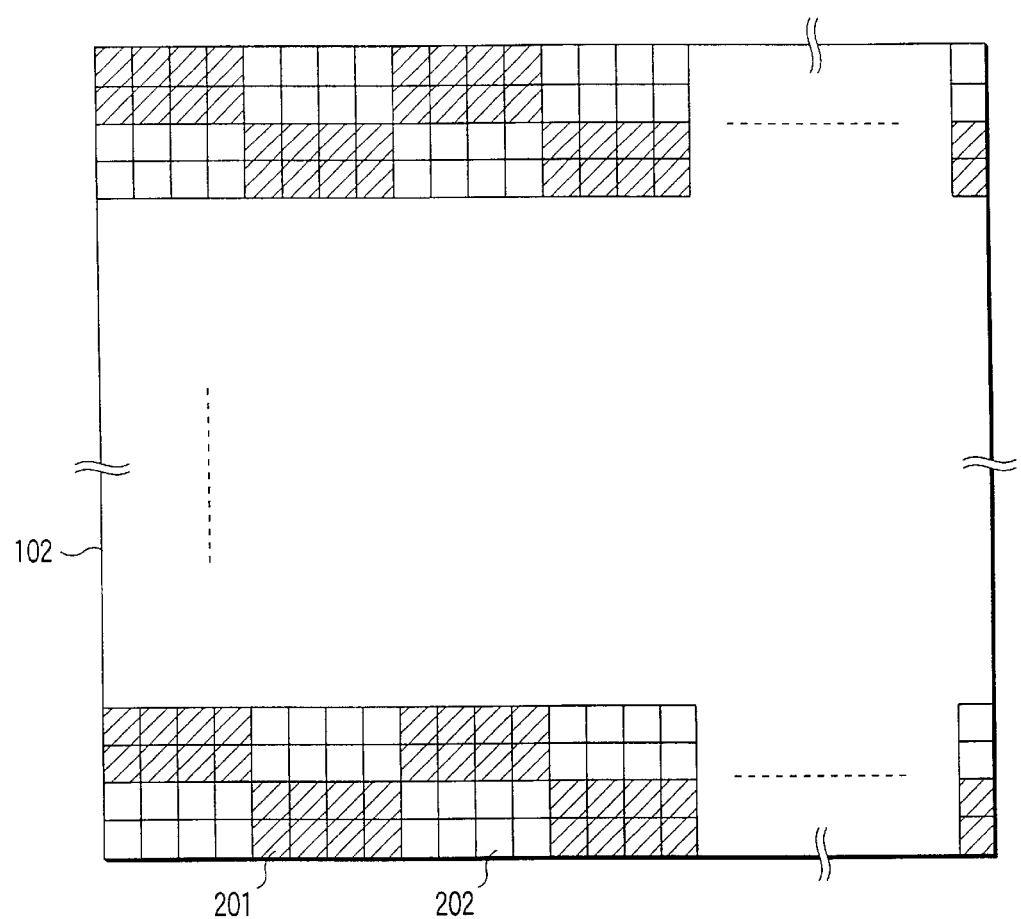
FIG. 2 is a schematic diagram illustrating pattern image information.
Figure 3:
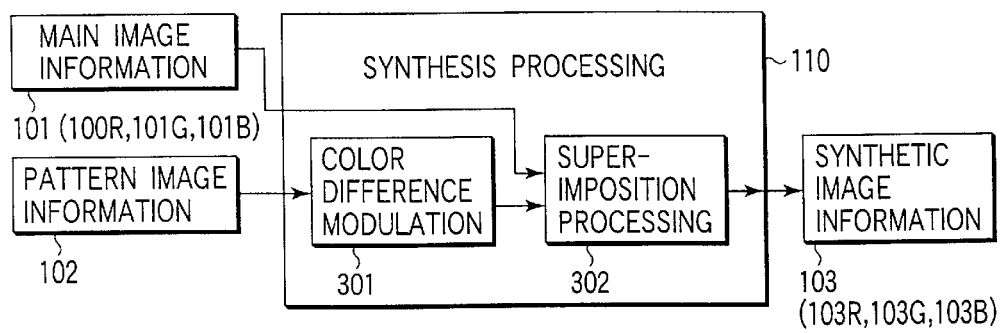
FIG. 3 is a flowchart illustrating how synthesis processing takes place.

A description will be given as to how to prepare the pattern image information 102. The pattern image information 102 is specifically a grid pattern of predetermined cycles. As shown in FIG. 2, the pattern image information of the first embodiment is comprised of rectangular black patterns 201 and rectangular white patterns 202. These rectangular patterns, each of which is made up of 4 pixels (horizontal)×2 pixels (vertical), are arranged in a cyclic pattern. (The period of the cyclic pattern of the grid corresponds to 8 pixels in the horizontal direction, and to 4 pixels in the vertical direction.) The vertical size and the horizontal size of the pattern image information are relative dimensions, and the horizontal size need not be greater than the vertical size.

The horizontal pixel size and vertical pixel size of the grid are required to satisfy the following ratio:

$$a/b > 1$$

where a is a larger number between the horizontal size and the vertical size of the grid of the pattern image information, b is a smaller number between them. Preferably, the ratio a/b is in the range of 2 to 8.

The synthesis processing 110 will be described with reference to FIGS. 3 through 8.

The main image information 101 (101R, 101G, 101B) is image information on a natural image, such as a face image for identification. The main image information 101 is assumed to contain 24-bit information per pixel (8 bits for each of "R", "G" and "B", in the range of 0 to 255).

FIGS. 4 and 5 show an example of the main image information 101. For simplicity, let us assume that the main image information 101 is uniformly gray, as represented by (R, G, B)=(127, 127, 127), and is partly cut out to have a size of 12×12 pixels. FIG. 4 shows the red components 101R of the main image information 101, and FIG. 5 shows the green components 101G thereof. Illustration of the blue components is omitted.

FIG. 6 shows an example of the pattern image information 102. The pattern image information 102 is made of a grid pattern of regular cycles. The pattern image information 102 is embedded in the main image information 101 in a state that is not recognizable to the naked eye of a human being. The pattern image information 102 contains 1-bit information per pixel (in the range of 0 to 255).

Like the main image information 101, the pattern image information 102 is assumed to be partly cut out to have a size of 12×12 pixels, as shown in FIG. 6. The pattern image information 102 is a grid pattern wherein the unit size is a rectangle of 4 pixels (horizontal)×2 pixels (vertical) and which is expressed as a cyclic pattern of black and white rectangles. In the pattern image information 102, the black color is indicated by "1", and the white color is indicated by "0."

First of all, color difference modulation processing step 301 is executed. In this step, the pattern image information 102 is subjected to color difference modulation processing, using the rules expressed by formulas (a-1) and (a-2) set forth below. By this processing, the color difference modulation processing step 301 creates color difference modulation pattern image information. According to the color difference modulation processing step 301, black and white pixels are assigned in accordance with the values of the pixels of the pattern image information 102 in such a manner that a back pixel is assigned to "+1"and a white pixel to "−1." Each of the values is multiplied by a color difference modulation amount Δv. This color difference modulation amount ΔV is in the range of 0 to 255 and is determined beforehand. In the color difference modulation processing step 301, this processing is executed for each pattern image information 102. FIG. 7 shows an example of a result of color difference modulation 102'.

$$CDMP(i,j)=(+1)*\Delta V \ldots \text{when } PAT(i,j)=(\text{black}) \quad (a\text{-}1)$$

$$CDMP(i,j)=(-1)*\Delta V \ldots \text{when } PAT(i,j)=(\text{white}) \quad (a\text{-}2)$$

where CDMP(i,j) represents the value the color difference modulation pattern image information takes at the position indicated by (x=i, y=j), PAT(i,j) represents the value the pattern image information takes at the position indicated by (x=i, y=j), and ΔV represents a color difference modulation amount.

The color difference modulation amount ΔV is an integer in the range of 0 to 255 ad is determined beforehand. The larger the color difference modulation amount ΔV is, the higher will be the visualization contrast at the time of verification. In this case, the verification is easy, but the synthetic image information is liable for adverse effects and may result in poor image quality. Hence, it is desirable that the color difference modulation amount ΔV be within the range of 16 to 96. In the present embodiment, ΔV=48.

In a superimposition processing step 302 subsequently executed, the color difference modulation pattern image information obtained in the processing described above is synthesized with the main image information 101 prepared beforehand, so as to obtain synthetic image information 103 (103R, 103G, 103b). In the superimposition processing step 302, superimposition processing indicated by the formulas (b-1) to (b-3) set forth below is executed.

$$DES\text{-}R(i,j)=SRC\text{-}R(i,j)+CDMP(i,j) \quad (b\text{-}1)$$

$$DES\text{-}G(i,j)=SRC\text{-}G(i,j)-CDMP(i,j) \quad (b\text{-}2)$$

$$DES\text{-}B(i,j)=SRC\text{-}B(i,j)-CDMP(i,j) \quad (b\text{-}3)$$

where DES-R(i,j) represents the value the synthetic image information takes at the position indicated by (x=i, y=j) (red components), DES-G(i,j) represents the value the synthetic image information takes at the position indicated by (x=i, y=j)(green components), DES-B(i,j) represents the value the synthetic image information takes at the position indicated by (x=i, y=j) (blue components), SRC-R(i,j) represents the value the main image information takes at the position indicated by (x=i, y=j) (red components), SRC-G(i,j) represents the value the main image information takes at the position indicated by (x=i, y=j) (green components), and SRC-B(i,j) represents the value the main image information takes at the position indicated by (x=i, y=j) (blue components).

DES-R(i,j), DES-G(i,j) and DES-B(i,j) are integers in the range of 0 to 255. That is, if a result of calculation is less than "0", it is set to be "0", and if it is greater than "255", it is set to be "255."

FIGS. 8 and 9 show results of superimposition processing. FIG. 8 indicates the case of red components, and FIG. 9 indicates the case of green components.

As can been seen from formulas (a-1) and (a-2), the coefficient for the color difference modulation amount ΔV alternately takes the values of "+1" and "−1" in accordance with the cycle of the pattern image information 102. If integration is carried out with respect to one cycle of the pattern image information 102, the values of the color difference modulation amount cancel each other, and the result of integration is thereby rendered zero. Hence, the following formulas are satisfied with respect to the cycles of the grid of the pattern image information 102.

$$\Sigma DES\text{-}R(i,j)=\rho SRC\text{-}R(i,j) \qquad (c\text{-}1)$$

$$\Sigma DES\text{-}G(i,j)=\Sigma SRC\text{-}G(i,j) \qquad (c\text{-}2)$$

$$\Sigma DES\text{-}B(i,j)=\Sigma SRC\text{-}B(i,j) \qquad (c\text{-}3)$$

These formulas (c-1) to (c-3) are satisfied for each area of the image. Hence, the overall atmosphere of the main image information 101 remains unchanged even after the main image information is integrated in the synthetic image information 103.

The average of the data values of the 12×12 pixels shown in FIGS. 8 and 9 is "127." As can be seen from this, the statistic value (average value) of the data values of the main image information is stored. The image information subjected to superimposition processing (namely, the synthetic image information) may be different from the main image information if attention is paid to the data value of each individual pixel. From a macroscopic viewpoint, however, it is hard to distinguish between the synthetic image information and the main image information. The statistic values of the main image information, such as the average value, are preserved. This being so, the synthetic image information and the main image information look like the same from a macroscopic viewpoint, e.g., when they are looked at on the basis of a size of 12×12 pixels.

As can be seen from formulas (a-1) and (a-2), the coefficient for the color difference modulation amount ΔV alternately takes the values of "+1" and "−1" in accordance with the cycle of the pattern image information 102. It should be noted that the signs of the coefficients of the green and blue components are the same, but the signs of the coefficient of the red components differ from them. This is to make use of the complementary-color relationship. In the first embodiment, red and cyan colors are used as complementary. When the sign of the red components is positive (+), the signs of the complementary colors, namely, the green and blue colors, are set to be negative (−). Conversely, when the sign of the red components is negative (−), the signs of the complementary colors, the green and blue colors, are set to be positive (+).

In this manner, when the signs of formulas (a-1) and (a-2) are determined, the value of the pattern image information 102 is set to be that of "black" or "white." When the value of the pattern image information 102 is that of "black", the values of the synthetic image information 103 are determined in such a manner that "red" is emphasized. When the value of the pattern image information 102 is that of "white", the values of the synthetic image information 103 are determined in such a manner that "cyan" is emphasized. In the synthetic image information 103, therefore, red-and cyan-color grid components are embedded at positions corresponding to the grid cycles of the pattern image information 102.

In FIG. 8, pixels whose data value is 175 emphasize "red", while pixels whose data value is 79 emphasize "cyan."

In those pixels that have many "red" components, a few "green" and "blue" components are present. Conversely, in those pixels that have a few "red" components, many "green" and "blue" components are present. Since the red color and the cyan colors (i.e., the green and blue colors) are complementary, it is hard to make a distinction between red and cyan colors when these colors are adjacent. To the eye of a human being, they look as if they were colorless. In the example shown in FIG. 8, the pixels that are rich in red color and the pixels that are rich in cyan color are repeatedly arranged in a cyclic pattern corresponding to the grid's cyclic pattern of the pattern image information 102. This means that the pixels that emphasize the red color (i.e., the pixels whose data value is 175) and the pixels that emphasize the cyan color (i.e., the pixels whose data value is 79) are arranged in regular cycles. When the pixel density is high, the slight differences between the red color and the cyan colors (complementary colors) are hard to perceive to the eye of a human being. To the human eye, the color differences are "0."

As can be seen from the above, a human being perceives the synthetic image information and the main image information as being identical, and therefore does not notice that an image that has been embedded.

$$(\text{Synthetic Image Information})\approx(\text{Main Image Information}) \qquad (d)$$

On the basis of the principles described above, it is possible to prepare synthetic image information 103 wherein pattern image information 102 is embedded in main image information 101 in a state that is not recognizable. By printing or recording the above synthetic image information 103 by a high-resolution printer (e.g., a 300 dpi dye-sublimation type thermal transfer printer), it is hard, or impossible, for the human eye to make a distinction between the synthetic image information and the main image information.

The synthetic image information 103 looks the same as ordinary image information, and image formats for general-purpose use (such as JPEG and TIFF) can be adopted. In addition, the synthetic image information 103 can be processed using an application that is adapted to process general types of image information. Accordingly, the system required can be realized with ease. Even if the synthetic image information is converted into another image format, the embedded pattern image information 102 remains the same, and the conversion does not give rise to any problems.

The synthetic image information 103 is printed or recorded by a high-resolution color printer (e.g., a dye-sublimation type thermal transfer printer), and the resultant information is pasted on an ID card or the like. Therefore, a system that determines whether or not the ID card 105 is authentic, checks the information embedded in the synthetic image information 103 pasted on the ID card 105, and determines whether or not the ID card 105 is authentic on the basis of the check. In other words, the pattern image information 102, which is sub image information invisibly embedded in the verification-use face image of the ID card, is sensed to determine whether or not the ID card 105 is authentic.

The pattern image information 102, which is the sub image information, is sensed by use of the mask sheet 113, and this mask sheet 113 is prepared on the basis of the pattern image information shown in FIG. 6. In terms of the pixel size or pixel position, the mask sheet 113 corresponds to the main image information 101 with a 1:1 relationship. The pattern image information 102 is made up of black patterns and transparent patterns. The black patterns have a value of "1" and do not allow transmission of light, while the transparent patterns have a value of "0" and allow transmission of light. The mask sheet 113 is physically laid over the synthetic image 104 printed on the ID card.

FIG. 10 is a schematic diagram illustrating the synthetic image 104 in the printed state. Where the synthetic image 104 is prepared on the basis of "uniformly-gray" main image information 101, red and cyan cyclic patterns are embedded as grid patterns. In FIG. 10, the pixels indicated by "R" are pixels that are rich in red, while the pixels indicated by "C" are pixels that are rich in cyan.

Figures 12, 13, 14:
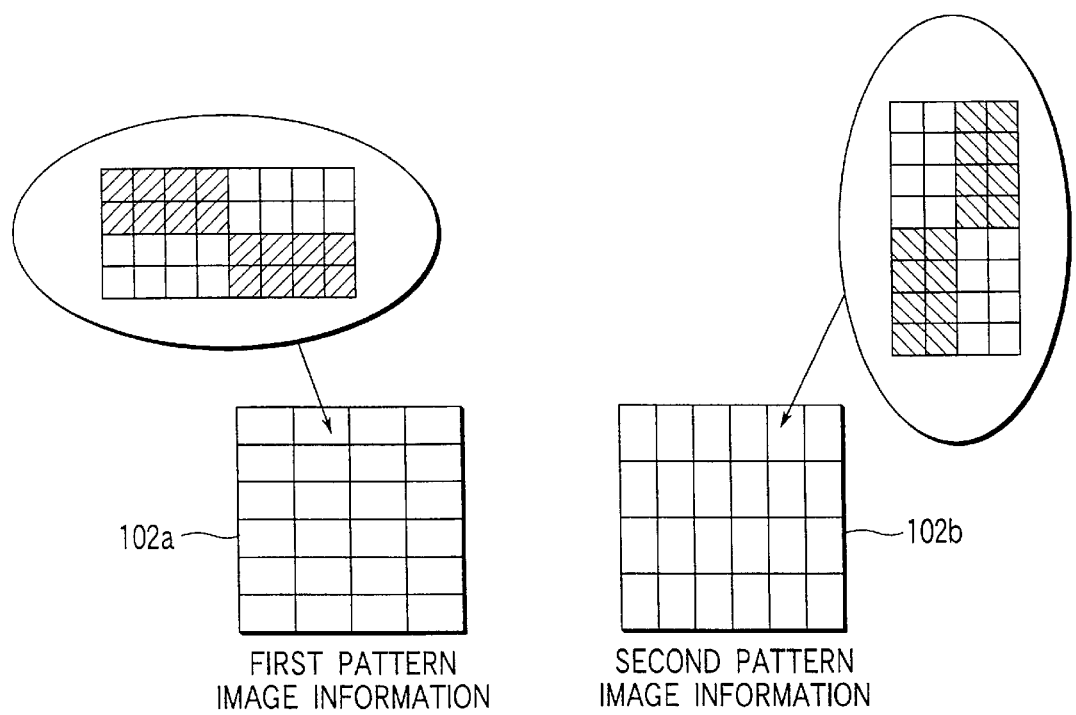
FIG. 12 is also a schematic diagram illustrating an example of verification processing.
FIG. 13 is a schematic view of first pattern image information according to the second embodiment of the present invention.
FIG. 14 is a schematic view of second pattern image information according to the second embodiment of the present invention.

FIGS. 11 and 12 schematically show how the synthetic image 104 shown in FIG. 10 will be when it is overlaid with the mask sheet 113 described above. FIG. 11 shows the case where the synthetic image 104 and the mask sheet 113 are positioned accurately relative to each other. FIG. 12 shows the case where the synthetic image 104 and the mask sheet 113 are shifted from each other by a half period of the cyclic grid pattern. In FIGS. 11 and 12, the pixels indicated with hatchings are those pixels that are masked by the mask sheet 113.

In FIG. 11, the pixels indicated by letter "R" are masked, and the pixels indicated by letter "C" are observable as being transparent. In this state, therefore, the grid looks like a cyan grid partly covered with a black mask. In FIG. 12, the pixels indicated by letter "C" are masked, and the pixels indicated by letter "R" are observable as being transparent. In this state, therefore, the grid looks like a red grid partly covered with a black mask.

When the printed synthetic image 104 overlaid with the mask sheet 113 is viewed, what will be observed is the state shown in FIG. 11, the state shown in FIG. 12, or the state intermediate between those shown in FIGS. 11 and 12. When the printed synthetic image 104 is fixed, and the mask sheet 113 is moved vertically or horizontally relative thereto, the states shown in FIGS. 11 and 12 are observed alternately. In other words, the cyan and red grids partly covered with the black mask are alternately observed. Hence, whether the synthetic image 104 is authentic or not can be determined by checking whether or not the red and cyan grids are alternately observed when the mask sheet is moved.

The relative movement between the printed synthetic image 104 and the mask sheet 113 need not be controlled precisely. Instead of the vertical or horizontal movement described above, a rotational movement may be used. In this case, moiré fringes are observed due to the slight shift between the black grid of the mask sheet 113 and the red or cyan grid which is partly covered. The authenticity determination can be made on the basis of the presence of such moiré fringes.

A description will now be given of the second embodiment.

In the second embodiment, the pattern image information 102 serving as sub image information is made by a plurality of pieces (N pieces). Reference will be made to the case where N=2.

FIGS. 13 and 14 show two kinds of pattern image information. The first pattern image information 102a is similar to the pattern image information 102 of the first embodiment. The second pattern image information 102b is prepared by rotating the first pattern image information 102a 90 in the clockwise direction.

Although the case where N=2 will be referred to in connection with the second embodiment, the number of pieces of pattern image information 102 may be determined arbitrarily. That is, pattern image information that is used as a reference is first prepared beforehand, and then other pieces of pattern image information are prepared by rotating the reference pattern image information by different angles. For example, in the case where N=3, second and third pieces of pattern image information are prepared by rotating the reference pattern image information 40° and 90°, respectively.

Figure 15:
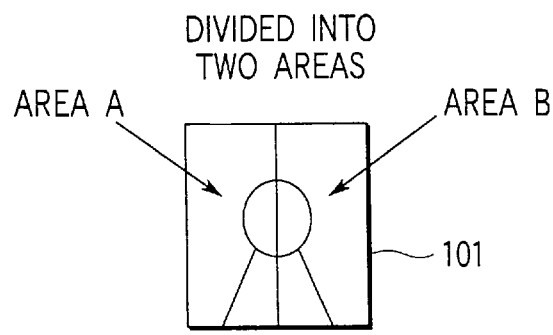
FIG. 15 illustrates an example of a manner in which main image information is divided.
Figure 16:
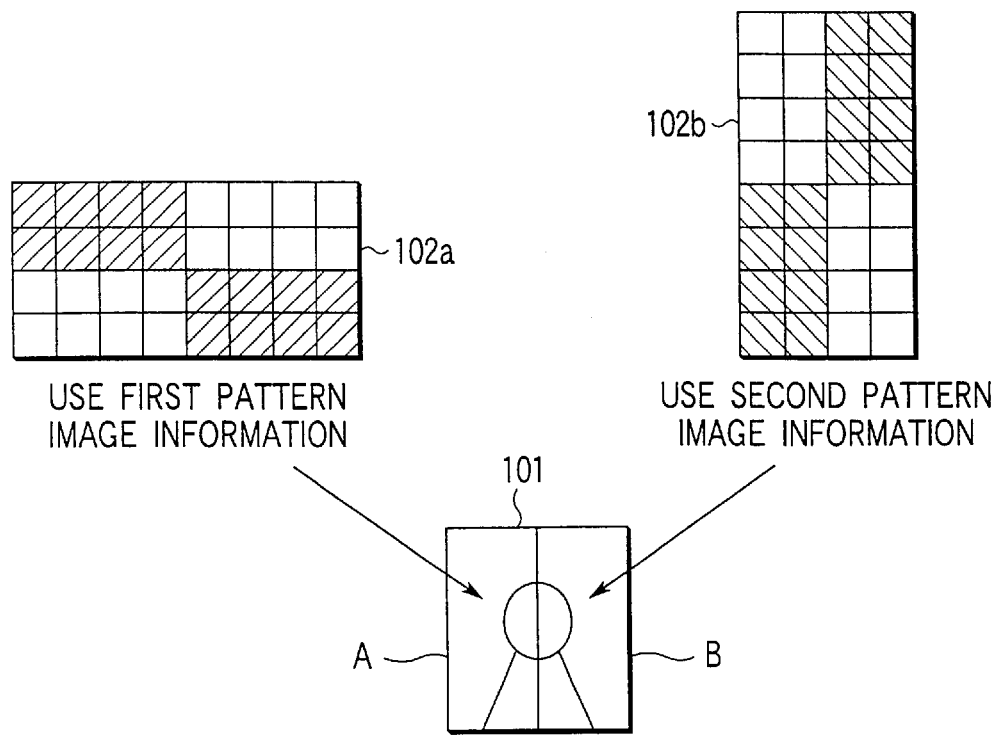
FIG. 16 illustrates how the divided main image information is synthesized with the first and second pattern image information.

Next, preparations for synthesis processing 110 are made. As shown in FIGS. 15 and 16, the main image information 101 is divided into N pieces. The manner in which it is divided is optional. In the second embodiment, the main image information 101 is divided into equal pieces, namely, area A (the left half) and area B (the right half). The two pieces 102a and 102b of pattern image information are assigned to these two areas A and B. As shown in FIG. 16, the first pattern image information 102a is associated with area A, and the second pattern image information 102b is associated with area B.

In the synthesis processing 110, the same method as described in connection with the first embodiment can be used without any modification. That is, first synthetic image information is prepared by synthesizing the first pattern image information 102a with area A of the main image information 101. Likewise, second synthetic image information is prepared by synthesizing the second pattern image information 102b with area B of the main image information 101. By simply combining these two pieces of synthetic image information, the resultant synthetic image contains two kinds of pattern image information. The synthetic image, prepared in this manner, is printed out by a high-resolution color printer, so that it can be used as an identification image of an ID card.

An example of the main image information 101 used in the second embodiment is shown in FIGS. 17 and 18. As in the first embodiment, the main image information 101 of the second embodiment is assumed to be uniformly gray, represented by (R, G, B)=(127, 127, 127), and partly cut out to have a size of 12×12 pixels. FIG. 17 illustrates red components of the main image information 101, and FIG. 18 illustrates green components thereof. Illustration of blue components is omitted.

In FIGS. 17 and 18, the area defined by coordinates x=0 to 5 constitutes area A, and the area defined by coordinates x=6 to 11 constitutes area B. The one-dot-chain line indicates the border between these two areas A and B.

FIGS. 19 and 20 show examples of pattern image information 102a and 202b, respectively.

FIG. 20 shows examples of pattern image information 102a and 102b. The first pattern image information 102a in FIG. 19 uses a pattern similar to that of the pattern image information 102 of the first embodiment, and is partly cut out to have a size of 6×12 pixels. The second pattern image information 102b in FIG. 20 is obtained by first rotating the pattern image information 102 of the first embodiment 90° in the clockwise direction and then partly cutting out to have a size of 6×12 pixels.

As described above, the area-A portion of the main image information 101 is synthesized with the first pattern image information 102a in a similar method to that described in connection with the first embodiment. Likewise, the area-B portion of the main image information 101 is synthesized with the second pattern image information 102b in a similar method to that described in connection with the first embodiment. The results of these synthetic operations are merely combined together to obtain synthetic image information. A schematic diagram illustrating the resultant synthetic image is shown in FIG. 21. In FIG. 21, the pixels indicated by letter "R" are pixels that are rich in red, and the pixels indicated by letter "C" are pixels that are rich in cyan.

For authenticity determination, a first mask sheet 113a is prepared beforehand from the first pattern image information 102a. The mask sheet 113a is laid on the printed synthetic image 104, as in the first embodiment. The states in which the first mask sheet 113 is laid are schematically illustrated in FIGS. 22, 23, 24 and 25.

FIG. 22 shows the case where the synthetic image 104 and the mask sheet 113a are positioned accurately relative to each other. FIG. 23 shows the case where the synthetic image 104 and the mask sheet 113 are shifted from each other by a half period of the cyclic grid pattern. In FIGS. 22 and 23, the pixels indicated with hatchings are those pixels that are masked by the mask sheet 113a.

FIG. 24 shows the case where the synthetic image 104 and the 90°-rotated mask sheet 113a are positioned accurately relative to each other. FIG. 25 shows the case where the synthetic image 104 and the 90°-rotated mask sheet 113a are shifted from each other by a half period of the cyclic grid pattern. In FIGS. 24 and 25, the pixels indicated with hatchings are those pixels that are masked by the mask sheet 113a.

Referring to FIG. 22, in area A and on part of the border between areas A and B, only the pixels indicated by letter "C" are observed as being transparent. On the other hand, in area B, both the pixels indicated by letter "R" and the pixels indicated by letter "C" are observed. In other words, red and cyan colors observed in the mixed state. Since these two colors (red and cyan colors) are complementary to each other, it is hard to distinguish between them to the naked eye of a human being as long as the pixels are printed at a density as high as 300 dpi. In this state, therefore, the cyan grid is observed between the black masks in area A, and what is seen in area B is blurred and no image is observed.

Referring to FIG. 23, in area A and on part of the border between areas A and B, only the pixels indicated by letter "R" are observed as being transparent. On the other hand, in area B, both the pixels indicated by letter "R" and the pixels indicated by letter "C" are observed in the mixed state. In this state, therefore, the red grid is observed between the black masks in area A, and what is seen in area B is blurred and no image is observed.

When the printed synthetic image 104 overlaid with the mask sheet 113a is viewed, what will be observed is the state shown in FIG. 22, the state shown in FIG. 23, or the state intermediate between those shown in FIGS. 22 and 23. When the printed synthetic image 104 is fixed, and the mask sheet 113a is moved vertically or horizontally relative thereto, the states shown in FIGS. 22 and 23 are observed alternately. In other words, in only area A, the cyan and red grids partly covered with the black mask are alternately observed. In area B, the image is blurred, and no clear pattern is observed.

FIG. 26 is a schematic diagram illustrating how verification processing is executed. When the mask sheet 113a is moved relative to the synthetic image, the red and cyan grids alternately appear in area A only. Alternatively, moiré fringes are generated, and changes are thereby produced in the image that is being perceived. On the basis of the presence or absence of such changes, it is possible to determine whether or not the synthetic image 104 is authentic.

A description will now be given of the third embodiment.

The third embodiment employs first and second pattern image information 102a and 102b that are similar to those described above in connection with the second embodiment. According to the third embodiment, an area is divided on the basis of the image information (binary image information) representing the binary values (black and white) of characters or symbols, and the first and second pattern image information 102a and 102b are applied to the divisions of the area. As in the first and second embodiments, the main image information 101 may be a photographic natural image, such as a landscape or a face image for identification. The binary image information may be prepared beforehand; alternatively, it may be externally provided when synthetic image information is to be prepared.

Figure 27:
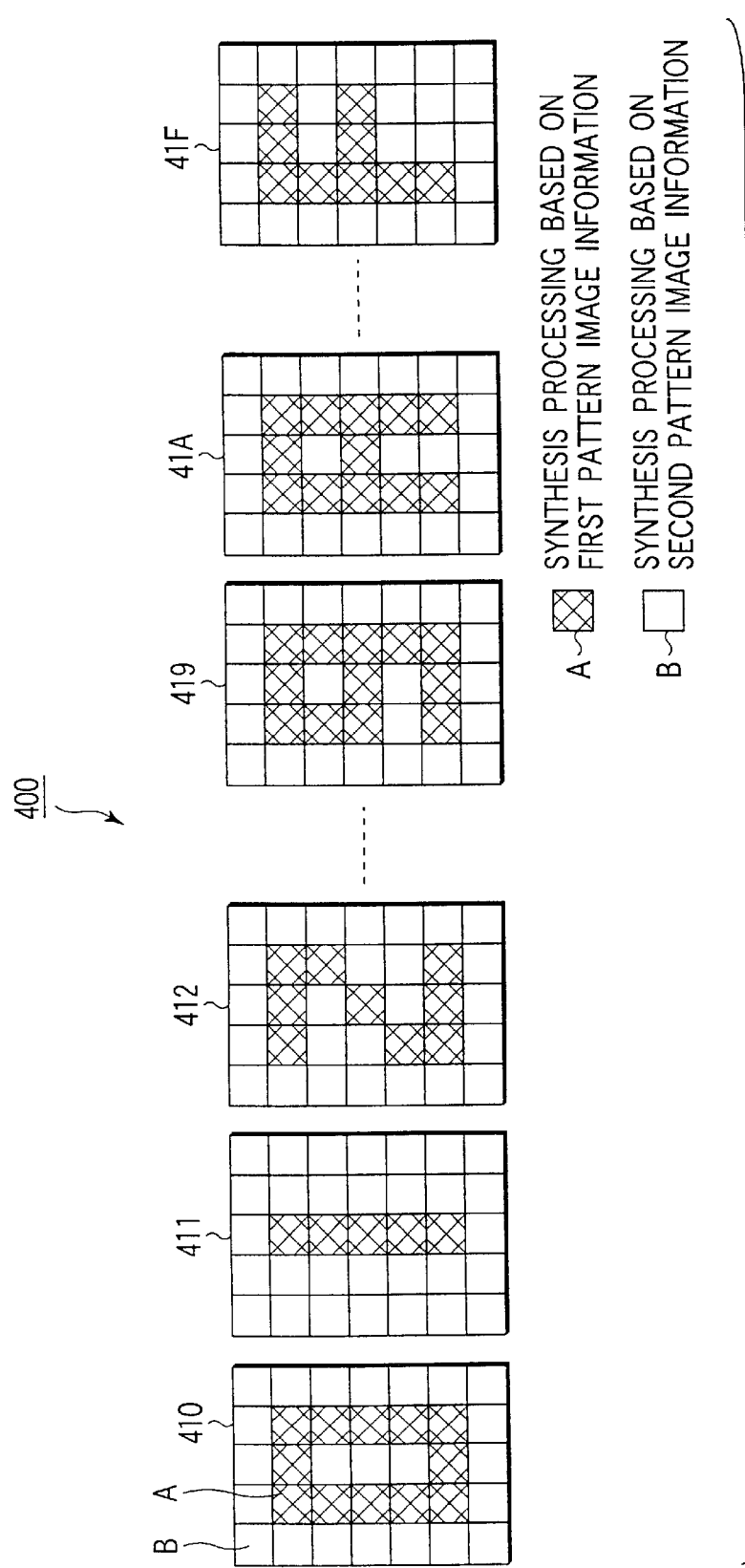
FIG. 27 illustrates sub image information according to the third embodiment of the present invention.

FIG. 27 illustrates an example of a manner in which the first and second pattern image information 102a ad 102b are applied to binary image information 400, which is divided into small areas. In the example shown in FIG. 27, the first and second pattern image information 102a and 102b are applied to images (410 to 419) of numerals "0" to "9" and images (41A to 41F) of alphabetic characters "A" to "F." The image information serving as the binary image information has the same size as an area to be embedded. For example, when numeral "0" is to be embedded in the entire image information, the binary image information representing numeral "0" is first processed in such a manner that it has the same size as the main image information, and then synthesis processing is executed. When binary image information representing a plurality of numerals or symbols is embedded in a partial area of the main image of the binary image information, the binary image information is magnified in such a manner that it is the same in size as the embedding area, and then synthesis processing is executed.

Figure 28:
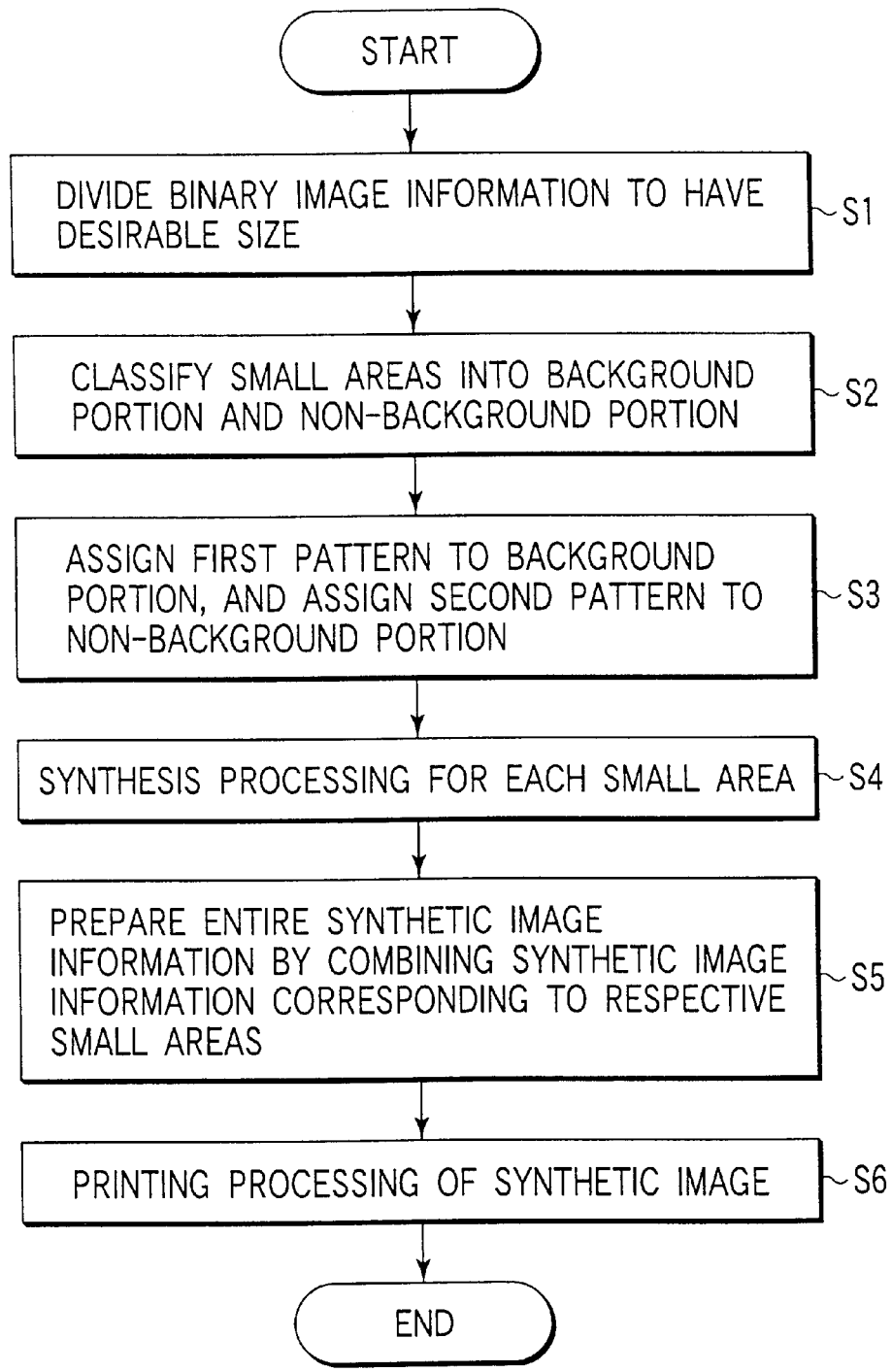
FIG. 28 is a flowchart illustrating how image synthesis processing is executed on the basis of binary image information.

A description will be given with reference to the flowchart shown in FIG. 28, as to how the image synthesis processing is executed on the basis of binary image information.

First of all, the binary image information is divided to have desirable dimensions (l×m) (Step S1). In the example shown in FIG. 27, l=5 and m=7. The small areas of the divided binary image information are classified by checking whether they correspond to a character or symbol portion or if they correspond to a background portion, which is other than the character or symbol portion (Step S2). Either the first pattern image information 102a or the second pattern image information 102b is assigned to each of the small areas (Step S3). For example, the first pattern image information 102a is assigned to the background portion, which is other than the character or symbol, and the second pattern image information 102b is assigned to the character or symbol portion (the non-background portion).

After either the first pattern image information 102a or the second pattern image information 102b is assigned, each small area is subjected to the synthesis processing described in connection with the first embodiment (Step S4). By executing synthesis processing for each small area, synthetic image information corresponding to each small area is prepared. All of the resultant synthetic image information corresponding to the respective small areas are merely combined (Step S5).

By this combination, the synthetic image information, which correspond to the respective small areas, constitute an image having the original size (i.e., the size of the embedding area of the main image information). The synthetic image information of the original size is printed on a recording medium by using a high-resolution dye-sublimation type thermal transfer printer, for example (Step S6). In this manner, an ID card bearing the printed synthetic image information is prepared.

The synthetic image information prepared according to the third embodiment can be checked for authenticity by using the mask sheet 113a based on the first pattern image information 102a in a similar manner to that of the second embodiment. To be more specific, a mask sheet 113a is prepared beforehand from the first pattern image information 102a. The mask sheet 113a is laid on a synthetic image 104, which is a printed form of the synthetic image information. The printed synthetic image 104 and the mask sheet 113a are moved relative to each other, in such a manner that the relative movement is either linear movement (vertical or horizontal movement) or rotation. After this relative movement, the synthetic image 104 has a contrast between the portions where the first pattern image information 102a is embedded and the portions where the second pattern image information 102b is embedded. The contrast is produced due to the principle described above in connection with the second embodiment. It should be noted that the portions where the second pattern image information 102b is embedded correspond to the background portions of the characters and symbols of the sub image information and that the portions where the first pattern image information 102a is embedded correspond to the non-background portions (i.e., the characters and symbols themselves). Hence, the characters and background of the sub image information are indicated in the synthetic image, with a contrast being produced.

As can be seen from the above, an authenticity determination can be made by checking whether the embedded sub image information can be visually perceived. According to the third embodiment, moreover, characters or symbols can be embedded in a state that cannot be recognized to the eye of a human being, and the characters, symbols or other embedded information can be sensed in a simple and easy method.

The information processing method described above enables issuance of an ID card bearing a face image which is for identification use and which provides a high degree of security. Since the information used for authenticity determination is embedded in a state that cannot be recognized to the naked eye of a human being, the main image information is allowed to maintain its high quality. Furthermore, an authenticity determination can be easily made with no need to employ a complicated machine.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing method for embedding a pattern image in a main image in such a state that is not recognizable to the naked eye of a human being, comprising:

preparing main image information that is recognizable to the naked eye of a human being;

preparing pattern image information;

executing color difference modulation processing for the pattern image information in accordance with a color modulation amount, such that a first color alternates with a second color complementary thereto;

superimposing the pattern image information modulated in color difference by the color difference modulation processing on the main image information, thereby preparing synthetic image information such that a synthesized state is not recognizable to the naked eye of the human being; and recording the synthetic image information on a recording medium as a visible image;

wherein existence of the pattern image in the recording medium becomes recognizable to the naked eye of a human being when the synthetic image information recorded on the recording medium is physically superimposed with and moved relative to a mask sheet having the same pattern of light transmission distribution ratio as the pattern image information.

2. An information processing method for embedding a pattern image in a main image in such a state that is not recognizable to a naked eye of a human being comprising:

preparing main image information that is recognizable to the naked eye of a human being;

preparing a plurality of kinds of pattern image information;

dividing the main image information into a plurality of areas;

preparing synthetic image information by bringing the plurality of kinds of pattern image information into correspondence with each area of the main image information, and synthesizing each pattern image information with each area of the main image information, such that a synthesized state is not recognizable to the naked eye of the human being; and recording the synthetic image information on a recording medium as a visible image wherein existence of the pattern image in the recording medium becomes recognizable to the naked eye of a human being when the synthetic image information recorded on the recording medium is physically superimposed with and moved relative to a mask sheet having the same pattern of light transmission distribution ratio as the plurality of kinds of pattern image information.

3. An information processing method according to claim 2, wherein the plurality of kinds of the pattern image information are prepared by rotating a reference pattern image information.

4. An image information processing according to claim 2, wherein the plurality of kinds of pattern images include first pattern image information and second pattern image information obtained by rotating the first pattern image information by 90°.

5. An image processing method for embedding a pattern image in a main image in such a state that is not recognizable to a naked eye of a human being comprising:

preparing main image information that is recognizable to the naked eye of a human being;

preparing first pattern image information and second pattern image information different from the first pattern image information;

dividing the main image information into a first area corresponding to binary image information, and a second area which is other than the binary image information;

preparing synthetic image information by synthesizing first pattern image information with the divided first area of the main image information, such that a synthesized state is not recognizable to the naked eye of the human being, and synthesizing second pattern image information with the divided second area of the main image information, such that a synthesized state is not recognizable to the naked eye of a human being; and recording the synthetic image information on a recording medium as a visible image.

6. An image information processing according to claim 5, wherein the second pattern image information is prepared by rotating the first pattern image information.

7. An image, comprising:

a main image recognizable by the naked eye of a human being;

a patterned image embedded in the main image such that the patterned image is not recognizable by the naked eye;

a synthetic image being the result of embedding the patterned image into the main image, the synthetic image being generated based upon a patterned image that is superimposed on the main image, the patterned image being modulated such that the color of the patterned image alternates with a color complimentary thereto; and a recorded image being a recorded state of the synthetic image, the patterned image in the recorded image becoming visible to the naked eye when the recorded image is physically superimposed over and moved relative to a mask sheet having the same pattern of light transmission distribution ratio as the patterned image.

8. The image of claim 7, wherein:

the patterned image comprises a plurality of kinds of patterned images, the main image is divided into a plurality of areas, the synthetic image being generated by bringing one of the plurality of kinds of patterned images into correspondence with each of the plurality of areas of the main image, and modulating the plurality of kinds of patterned images to generate the synthetic image, the plurality of kinds of patterned images not being recognizable by the naked eye.

9. The image of claim 8, wherein the plurality of kinds of patterned images are generated by rotating one patterned image.

10. The image of claim 9, wherein the plurality of kinds of patterned images are generated by rotating the one patterned image by 90°.

11. An image, comprising:

a main image recognizable by the naked eye of a human being, the main image being divided into a first area corresponding to binary information and a second area corresponding to information other than binary information;

a plurality of kinds of patterned images embedded in the main image such that the patterned images are not recognizable by the naked eye, the plurality of kinds of patterned images including a first patterned image and a second patterned image different from the first patterned image;

a synthetic image being the result of embedding the first patterned image into the first area of the main image and the second patterned image into the second area of the main image wherein existence of the plurality of kinds of patterned images in image become recognizable to the naked eye of a human being when the synthetic image is physically superimposed with and moved relative to a mask sheet having the same pattern of light transmission distribution ratio as the plurality of kinds of patterned images.

12. The image of claim 11, wherein the second patterned image is made by rotating the first patterned image.

* * * * *